United States Patent

Messick et al.

[11] Patent Number: 6,152,171
[45] Date of Patent: Nov. 28, 2000

[54] CHECK VALVE

[75] Inventors: DeLaun T. Messick; Mark A. Novak, both of West Des Moines, Iowa

[73] Assignee: International Valve Corp., West Des Moines, Iowa

[21] Appl. No.: 09/427,949

[22] Filed: Oct. 27, 1999

Related U.S. Application Data

[63] Continuation of application No. 09/260,938, Mar. 2, 1999.

[51] Int. Cl.⁷ .................................................. F16K 15/00
[52] U.S. Cl. ................................. 137/543.13; 137/515.7; 137/542
[58] Field of Search ........................ 137/515.7, 515, 137/542, 454.2, 543.13, 315; 251/148

[56] References Cited

U.S. PATENT DOCUMENTS

| | | | |
|---|---|---|---|
| 1,260,663 | 3/1918 | Gould et al. | 137/541 |
| 2,170,478 | 8/1939 | Long et al. | 137/542 |
| 2,351,874 | 6/1944 | Parker | 137/542 |
| 2,804,281 | 8/1957 | Osburn | 137/543 |
| 2,943,639 | 7/1960 | Smith | 137/543 |
| 2,973,008 | 2/1961 | Klose | 137/543 |
| 3,209,777 | 10/1965 | Salisbury | 137/543.13 |
| 3,434,495 | 3/1969 | Scaramucci | 137/542 |
| 3,608,576 | 9/1971 | Wilheim | 137/491 |
| 3,749,122 | 7/1973 | Gold | 137/515.7 |
| 3,937,249 | 2/1976 | Suey | 137/543.13 |
| 4,148,338 | 4/1979 | Skoli | 137/515.7 |
| 4,279,403 | 7/1981 | Hobson | 137/515.7 |
| 4,453,561 | 6/1984 | Sands | 137/543.13 |
| 4,653,725 | 3/1987 | Nanz et al. | 251/148 |
| 4,827,968 | 5/1989 | Brown | 137/543.13 |
| 5,033,503 | 7/1991 | Horton et al. | 137/454.2 |

*Primary Examiner*—Gregory L. Huson
*Assistant Examiner*—Joanne Y. Kim
*Attorney, Agent, or Firm*—Zarley, McKee, Thomte, Voorhees & Sease

[57] ABSTRACT

A check valve is positioned in and between opposed tube ends and includes a valve body having a valve seat engageable by a valve element having a stem extending centrally of peripherally spaced apart elements interconnected by an annular end shoulder engaged by a keeper which receives the outer end of the valve stem and holds a coil spring against the valve element. The valve assembly is disassembled by manipulating the keeper against the spring out of engagement with the annular end shoulder.

9 Claims, 3 Drawing Sheets

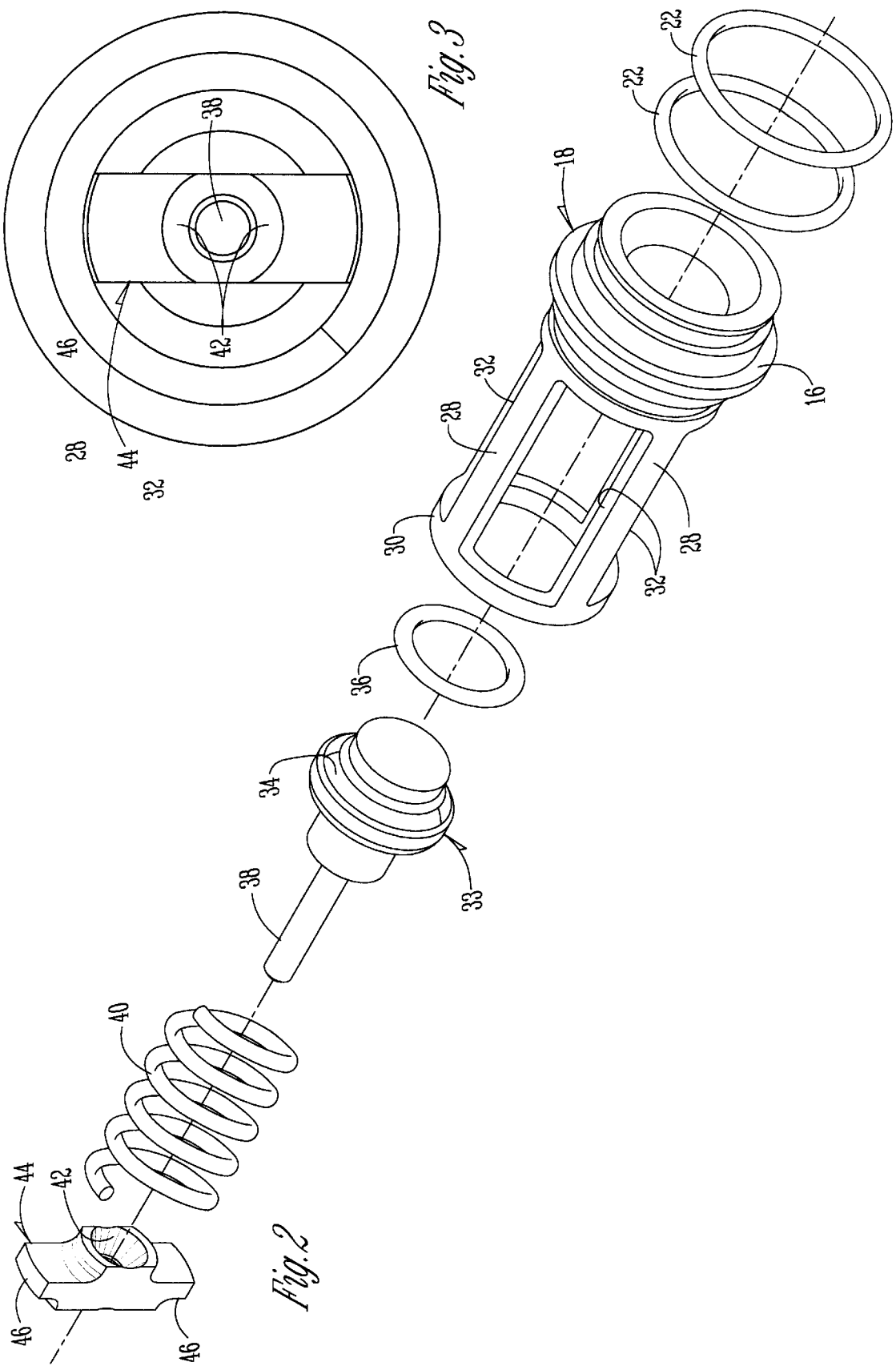

CHECK VALVE

CROSS-REFERENCE TO A RELATED APPLICATION

The application is a continuation of Ser. No. 09/260,938, filed Mar. 2, 1999.

BACKGROUND OF THE INVENTION

The check valve of U.S. Pat. No. 5,033,503 on which I am a co-inventor sold by Check-All Valve, Mfg. Co., Des Moines, Iowa, has been very successful. In food processing, however, modifications to this valve when used in sanitary tubing are needed that will minimize cracks and crevices where microbal and bacterial growth may occur and for ease of cleaning and sterilization.

SUMMARY OF THE INVENTION

The valve is mounted entirely within opposed tube ends which engage an annular shoulder on the valve body to hold the valve stationary.

The valve body includes a valve seat and a plurality of longitudinally extending spaced apart elements interconnected by an annular end shoulder which engages a keeper positioned between the elements and which receives the stem of a valve element. The valve element includes a seat engageable with the valve body seat. A coil spring is positioned on the stem of the valve element and engages the keeper to maintain the valve element in a normally closed position.

The flow of liquid through the valve assembly is maximized by the substantial spacing between the component parts which in turn allows for ease of the assembly and disassembly for cleaning. The keeper is readily accessible from the open end of the annular end shoulder and through the spacing between the longitudinally extending spaced apart elements. The keeper has a passageway through it which receives the outer end of the valve element stem. The passageway increases in cross-sectional area in opposite directions allowing the keeper to be pivoted on the stem for ease of positioning between the elongated spaced apart elements and against the annular end shoulder.

DESCRIPTION OF THE DRAWINGS

FIG. 2 is an exploded view of the valve assembly.

FIG. 3 is an end elevational view taken from the left end of FIG. 1 along lines 3—3.

DESCRIPTION OF THE PREFERRED EMBODIMENT

Figure 1:
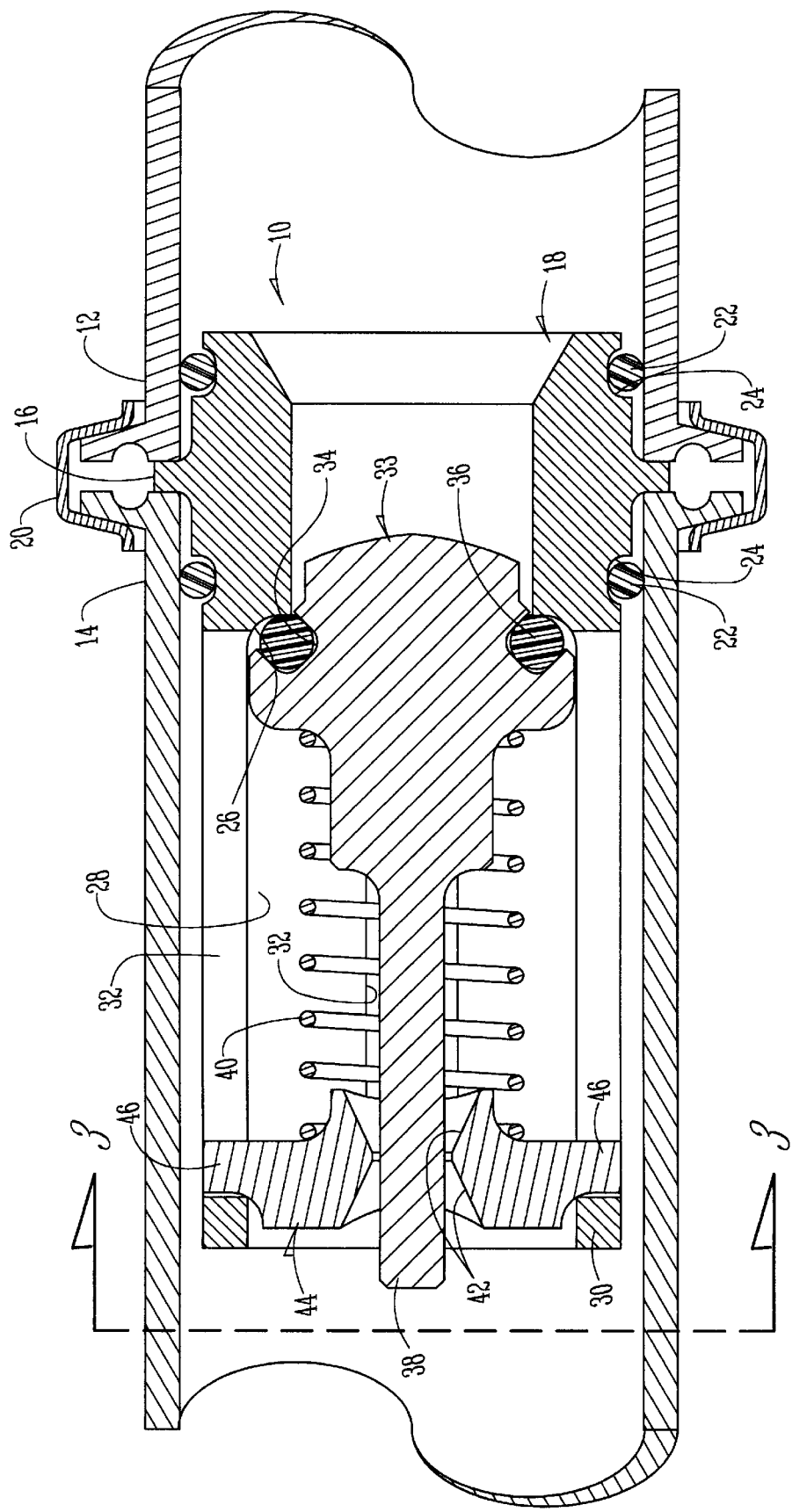
FIG. 1 is fragmentary side elevational view of the check valve positioned in the opposed ends of a pair of tubes.

The valve assembly of this invention is referred to generally in FIG. 1 by the reference numeral 10 and is seen mounted in the opposed tube ends 12 and 14 which engage an annular shoulder 16 on a valve body 18. A clamp 20 locks the tube ends 12 and 14 to the valve body 18.

A pair of O-rings 22 are received in annular recesses 24 on opposite sides of the annular shoulder 16 to provide a seal between the valve body 18 and the inside surfaces of the tube ends 12 and 14. The valve body 18 includes a valve seat 26.

The valve body 18 includes longitudinally extending spaced apart elements 28 which are interconnected at their outer ends by an annular end shoulder 30 providing substantial spacing 32 therebetween. The annular end shoulder 30 provides an open end to the valve body.

A valve element 33 includes a seat 34 which receives an O-ring 36 engageable with the valve body seat 26. A valve stem 38 extends through a coil spring 40 into a keeper passageway 42 which increases in cross-sectional area from the center outwardly in opposite directions to allow manipulation on the stem 38 when being assembled and disassembled. The keeper 44 includes opposite ends 46 which are positioned between the valve body elements 32 against the annular shoulder 30.

It is thus seen that in operation a predetermined fluid pressure against the valve element 33 causes the valve to open allowing free flow of liquid therethrough around the valve element and through the spacing 32 and out the open end through the annular shoulder 30 around the keeper 44. Cleaning of the valve assembly 10 is simplified by the valve design which allows for efficient removal from between the tube ends 12 and 14 upon removal of the clamp 20. The keeper 44 is easily pivoted on the valve stem 38 to allow for its removal through the annular end shoulder 30 thereby allowing the valve element 33 to be removed exposing the interior of the valve body 18 for cleaning.

Figure 4:
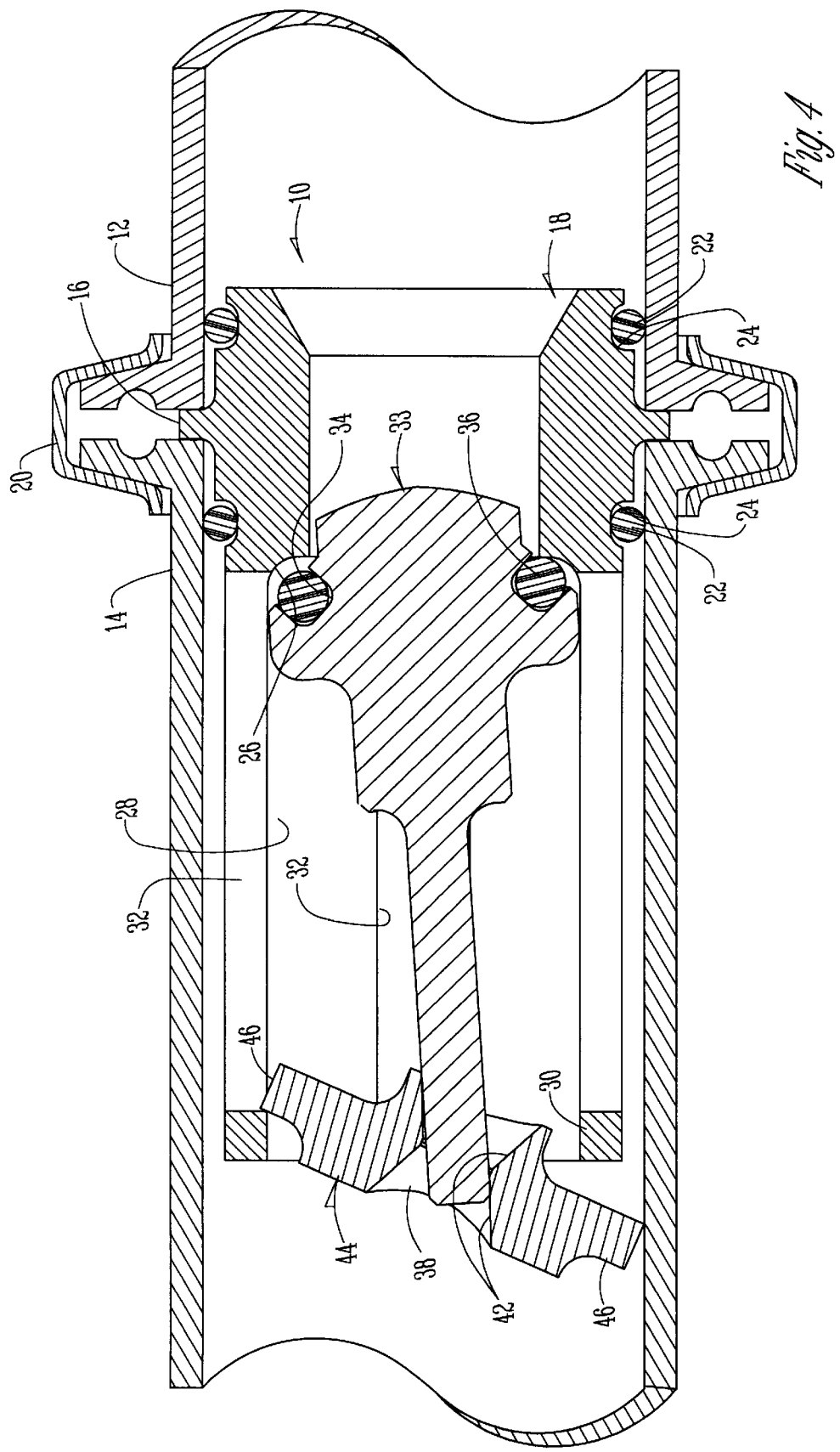
FIG. 4 is identical to FIG. 1 except that the spring has been removed for clarity and the valve element is displaced to show that the valve assembly cannot be disassembled while in the tube end.

As seen in FIG. 4, it is an inherent part of the invention that while valve assembly 10 is within tube end 14, keeper 44 is restrained by annular end shoulder 30 and tube end 14 even upon maximum pivot of keeper 44. The maximum pivot of keeper 44 is constrained by the side wall of the keeper passageway 42 contacting stem 38. This prevents keeper 44 from fully leaving the valve body 18 while within tube end 14. Conversely, when the valve assembly is removed from the tube end 14, keeper 44 maybe removed from the valve assembly for cleaning. Thus the valve assembly cannot become accidentally disassembled when in use even if, for example, the spring 40 should fail.

What is claimed is:

1. A readily removable valve keeper comprising,
    a passage way increasing in cross-sectional area in opposite directions wherein the valve keeper is adapted to pivot on a received valve stem, and
    said keeper having opposite ends extending from said passageway and having opposite sides wherein one said side is adapted to contact a valve shoulder and said opposing side is adapted to contact a valve element.
2. The valve keeper of claim 1 wherein said opposite ends are adapted to contact an enclosure when pivoted.
3. The valve keeper of claim 2 wherein said enclosure is a pipe wall.
4. The valve keeper of claim 3 wherein said valve element is a spring.
5. A valve assembly 10 comprising,
    a pair of tube sections 12 & 14 having walls and end portions in end to end relationship,
    a valve body 18 including a valve seat 26, and a longitudinal element 28 extending into one of said tube sections 14 and having an annular shoulder 30,
    a valve element 33 including an element seat 34 adapted to engage said valve seat 26, a valve stem 38 extending substantially parallel and centrally of said one tube section wall 14, and a spring 40 on said stem 38, and
    a keeper element 44 including opposite sides, a passageway 42 in said keeper wherein said valve stem 38 is positioned in said passageway 42 with one side of said keeper engaging said annular shoulder 30 and the opposite side of said keeper element 44 engaging said spring 40, and said keeper element 44 having ends 46 extending from said passageway 42 wherein one said keeper end is restrained by said tube 14 from pivoting past said annular shoulder 30, whereby disassembly of said valve assembly 10 is prevented while in said one tube section 14.

6. A valve assembly of claim 5 wherein said valve body further includes a second annular shoulder engaged by said tube sections end portions.

7. A valve assembly of claim 5 further comprising,
   a seal between said tube walls and said valve body.

8. A valve assembly of claim 7 wherein said valve element further comprises a seal between said element seat and said valve seat.

9. A valve assembly of claim 5 wherein said ends of said keeper element may pivot clear of said annular shoulder when not constrained by said tube wall of said one tube section.

* * * * *